US012601848B2

(12) United States Patent
Frederiksen et al.

(10) Patent No.: US 12,601,848 B2
(45) Date of Patent: Apr. 14, 2026

(54) RANDOM ACCESS TYPE SELECTION BASED ON ACCURACY OF SATELLITE POSITIONING INFORMATION

(71) Applicant: Nokia Technologies Oy, Espoo (FI)

(72) Inventors: Frank Frederiksen, Aalborg (DK);
Jeroen Wigard, Aalborg (DK);
Konstantinos Manolakis, Munich (DE)

(73) Assignee: NOKIA TECHNOLOGIES OY,
Espoo (FI)

( * ) Notice: Subject to any disclaimer, the term of this
patent is extended or adjusted under 35
U.S.C. 154(b) by 362 days.

(21) Appl. No.: 18/263,392

(22) PCT Filed: Jan. 14, 2022

(86) PCT No.: PCT/EP2022/050742
§ 371 (c)(1),
(2) Date: Jul. 28, 2023

(87) PCT Pub. No.: WO2022/171379
PCT Pub. Date: Aug. 18, 2022

(65) Prior Publication Data
US 2024/0090037 A1     Mar. 14, 2024

(30) Foreign Application Priority Data
Feb. 10, 2021     (FI) ..................................... 20215137

(51) Int. Cl.
| | |
|---|---|
| *H04W 64/00* | (2009.01) |
| *G01S 19/39* | (2010.01) |
| *H04W 74/0833* | (2024.01) |
| *H04W 74/0836* | (2024.01) |

(52) U.S. Cl.
CPC .......... *G01S 19/396* (2019.08); *H04W 64/00*
(2013.01); *H04W 74/0833* (2013.01); *H04W*
*74/0836* (2024.01)

(58) Field of Classification Search
CPC ..... H04W 4/027; H04W 4/029; H04W 64/00;
H04W 74/0833
See application file for complete search history.

(56) References Cited

FOREIGN PATENT DOCUMENTS

| | | |
|---|---|---|
| WO | 2020/220311 A1 | 11/2020 |
| WO | 2020/221861 A1 | 11/2020 |

OTHER PUBLICATIONS

"3rd Generation Partnership Project; Technical Specification Group Radio Access Network; NR; Physical layer procedures for control (Release 16)", 3GPP TS 38.213, V16.3.0, Sep. 2020, pp. 1-179.
"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

(Continued)

*Primary Examiner* — Sam Bhattacharya
(74) *Attorney, Agent, or Firm* — Carter, DeLuca & Farrell LLP

(57)     ABSTRACT

Various example embodiments relate to performing random access to a communication network. An apparatus may determine satellite positioning information comprising a location of the apparatus and/or time information. The apparatus may determine an estimate of the accuracy of the satellite positioning information and select a type of random access procedure accordingly. Apparatuses, methods, and computer programs are disclosed.

1 Claim, 4 Drawing Sheets

(56)                    References Cited

OTHER PUBLICATIONS

"Solutions for NR to support non-terrestrial networks (NTN)", 3GPP TSG RAN meeting #86, RP-193234, Agenda: 9.1.2, Thales, Dec. 9-13, 2019, 10 pages.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.
"Accuracy of GNSS data", Wiki, Retrieved on Aug. 25, 2023, Webpage available at : https://wiki.openstreetmap.org/wiki/Accuracy_ of_GNSS_data.
"UL Time and Frequency Synchronisation for NR-NTN", 3GPP TSG RAN WG1 Meeting #102e, R1-2005496, Agenda: 8.4.2, MediaTek, Aug. 24-28, 2020, 14 pages.
"Discussion on UL synchronization for NTN", 3GPP TSG RAN WG1 #102-e, R1-2005964, Agenda: 8.4.2, ZTE, Aug. 17-28, 2020, 8 pages.

"Discussions on UL time and frequency synchronization enhancements in NTN", 3GPP TSG RAN WG1 #103-e, R1-2008411, Agenda: 8.4.2, LG Electronics, Oct. 26-Nov. 13, 2020, 7 pages.
IEEE 802.11, Wikipedia, Retrieved on Aug. 1, 2023, Webpage available at : https://en.wikipedia.org/wiki/IEEE_802.11.
Office action received for corresponding Finnish Patent Application No. 20215137, dated Jun. 21, 2021, 7 pages.
"NTN 2-step RACH selection enhancements", 3GPP TSG-RAN WG2 Meeting #113e, R2-2101790, Agenda: 8.10.2.1, Convida Wireless, Jan. 25-Feb. 5, 2021, 4 pages.
Office action received for corresponding Finnish Patent Application No. 20215137, dated Dec. 16, 2021, 5 pages.
International Search Report and Written Opinion received for corresponding Patent Cooperation Treaty Application No. PCT/ EP2022/050742, dated May 18, 2022, 11 pages.
"Enhancements on RACH in NTN", 3GPP TSG-RAN WG2 Meeting #113 electronic, R2-2101833, Agenda: 8.10.2.1, Asia Pacific Telecom, Jan. 25-Feb. 5, 2021, 4 pages.
"RACH Aspects for an NTN- Observations and Proposals", 3GPP TSG RAN WG2 Meeting #113, R2-2100251, Agenda: 8.10.2.1, Samsung, Jan. 25-Feb. 5, 2021, 5 pages.
Notice of Allowance received for corresponding European Patent Application No. 22702877.6, dated Jun. 11, 2024, 8 pages.

100

120

122

Satellite

HAPS

Earth

110

124

200

202

204

PROCESSOR

MEMORY

PROGRAM
CODE

206

COMMUNICATION
INTERFACE

USER
INTERFACE

208

210

Location + direction

120

110

UE
(perceived
location)

110

UE
(actual
location)

400

110

UE

420 gNB

401 — Msg1: Random access preamble →

← Msg2: Random access response — 402

403 — Msg3: Scheduled transmission →

← Msg4: Contention resolution — 404

700

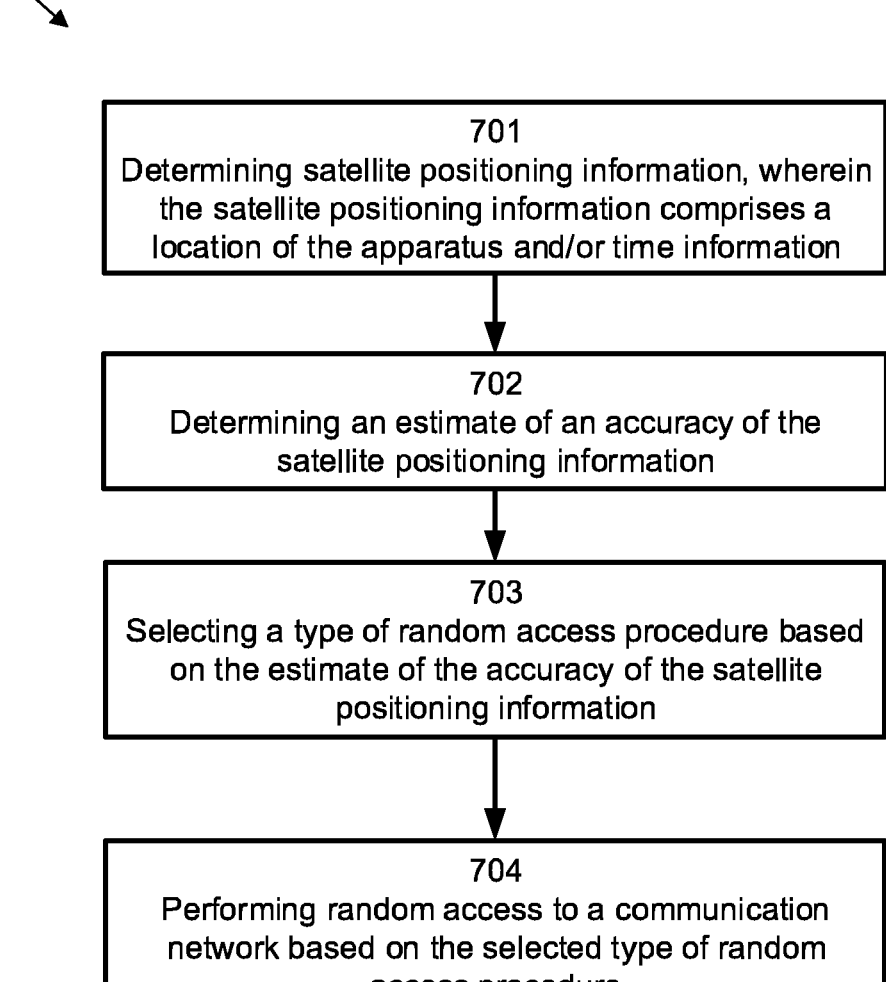

701
Determining satellite positioning information, wherein the satellite positioning information comprises a location of the apparatus and/or time information 702
Determining an estimate of an accuracy of the satellite positioning information 703
Selecting a type of random access procedure based on the estimate of the accuracy of the satellite positioning information 704
Performing random access to a communication network based on the selected type of random access procedure

FIG. 7

RANDOM ACCESS TYPE SELECTION BASED ON ACCURACY OF SATELLITE POSITIONING INFORMATION

RELATED APPLICATION

This application claims priority to PCT Patent Application No. PCT/EP2022/050742, filed Jan. 14, 2022, which claims priority to FI patent application No. 20215137, filed on Feb. 10, 2021, each which is incorporated herein by reference in its entirety.

TECHNICAL FIELD

Various example embodiments generally relate to the field of wireless communications. In particular, some example embodiments relate to selection of a random access procedure in non-terrestrial communication.

BACKGROUND

Various wireless communication systems, for example 3GPP 5G new radio (NR), may provide non-terrestrial network support for example by including base stations in satellites or by relaying signals to terrestrial base stations via satellites. A device such as for example a user equipment (UE) may be provided with positioning capability, for example by means of an integrated global navigation satellite system (GNSS) device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments improve efficiency and reliability of a random access procedure to a non-terrestrial network. Further implementation forms are provided in the dependent claims, the description, and the drawings.

According to a first aspect, an apparatus may comprise one or more processors, and memory storing instructions that, when executed by the one or more processors, cause the apparatus to: determine satellite positioning information, wherein the satellite positioning information comprises a location of the apparatus and/or time information; determine an estimate of an accuracy of the satellite positioning information; select a type of random access procedure based on the estimate of the accuracy of the satellite positioning information; and perform random access to a communication network based on the selected type of random access procedure.

According to an example embodiment of the first aspect, the instructions, when executed by the one or more processors, may further cause the apparatus to: select a first type of random access procedure, in response to determining that the estimate of the accuracy of the satellite positioning information is above a first threshold, wherein the first type of random access procedure comprises transmission of a random access preamble and a scheduled transmission without reception of a response to the random access preamble before the scheduled transmission.

According to an example embodiment of the first aspect, the instructions, when executed by the one or more processors, may further cause the apparatus to: determine a timing advance and/or a frequency offset for performing the random access to the communication network; determine whether the timing advance and/or the frequency offset comply with at least one configured value; and select the first type of random access procedure, further in response to determining that the timing advance and/or the frequency offset comply with the at least one configured value.

According to an example embodiment of the first aspect, the instructions, when executed by the one or more processors, may further cause the apparatus to: determine a received signal strength based on at least one signal received from the communication network; and select the first type of random access procedure, further in response to determining that the received signal strength is above a second threshold.

According to an example embodiment of the first aspect, the instructions, when executed by the one or more processors, may further cause the apparatus to: receive, from the communication network, an indication of at least one of the first threshold, the second threshold, or the at least one configured value.

According to an example embodiment of the first aspect, the first type of random access procedure may comprise a two-step random access procedure of a 3 GPP system.

According to an example embodiment of the first aspect, the instructions, when executed by the one or more processors, may further cause the apparatus to: select a second type of random access procedure, in response to determining not to select the first type of random access procedure, wherein the second type of random access procedure comprises: transmission of the random access preamble; reception of a random access response; and transmission of the scheduled transmission, in response to the reception of the random access response.

According to an example embodiment of the first aspect, the second type of random access procedure may comprise a four-step random access procedure of the 3GPP system.

According to an example embodiment of the first aspect, the communication network may comprise a non-terrestrial network.

According to a second aspect, a method may comprise determining satellite positioning information, wherein the satellite positioning information comprises a location of the apparatus and/or time information; determining an estimate of an accuracy of the satellite positioning information; selecting a type of random access procedure based on the estimate of the accuracy of the satellite positioning information; and performing random access to a communication network based on the selected type of random access procedure.

According to an example embodiment of the second aspect, the method may further comprise: selecting a first type of random access procedure, in response to determining that the estimate of the accuracy of the satellite positioning information is above a first threshold, wherein the first type of random access procedure comprises transmission of a random access preamble and a scheduled transmission without reception of a response to the random access preamble before the scheduled transmission.

According to an example embodiment of the second aspect, the method may further comprise: determining a timing advance and/or a frequency offset for performing the random access to the communication network; determining whether the timing advance and/or the frequency offset comply with at least one configured value; and selecting the first type of random access procedure, further in response to determining that the timing advance and/or the frequency offset comply with the at least one configured value.

According to an example embodiment of the second aspect, the method may further comprise: determining a received signal strength based on at least one signal received from the communication network; and selecting the first type of random access procedure, further in response to determining that the received signal strength is above a second threshold.

According to an example embodiment of the second aspect, the method may further comprise: receiving, from the communication network, an indication of at least one of the first threshold, the second threshold, or the at least one configured value.

According to an example embodiment of the second aspect, the first type of random access procedure may comprise a two-step random access procedure of a 3GPP system.

According to an example embodiment of the second aspect, the method may further comprise: selecting a second type of random access procedure, in response to determining not to select the first type of random access procedure, wherein the second type of random access procedure comprises: transmission of the random access preamble; reception of a random access response; and transmission of the scheduled transmission, in response to the reception of the random access response.

According to an example embodiment of the second aspect, the second type of random access procedure may comprise a four-step random access procedure of the 3GPP system.

According to an example embodiment of the second aspect, the communication network may comprise a non-terrestrial network.

According to a third aspect a computer program or a computer program product may comprise instructions for causing an apparatus to perform at least the following: determining satellite positioning information, wherein the satellite positioning information comprises a location of the apparatus and/or time information; determining an estimate of an accuracy of the satellite positioning information; selecting a type of random access procedure based on the estimate of the accuracy of the satellite positioning information; and performing random access to a communication network based on the selected type of random access procedure. The computer program may further comprise instructions for causing the apparatus to perform any example embodiment of the method of the second aspect.

According to a fourth aspect an apparatus may comprise: means for determining satellite positioning information, wherein the satellite positioning information comprises a location of the apparatus and/or time information; means for determining an estimate of an accuracy of the satellite positioning information; means for selecting a type of random access procedure based on the estimate of the accuracy of the satellite positioning information; and means for performing random access to a communication network based on the selected type of random access procedure. The apparatus may further comprise means for performing any example embodiment of the method of the second aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 7 illustrates an example of a method for performing random access, according to an example embodiment.

Like references are used to designate like parts in the accompanying drawings.

DETAILED DESCRIPTION

Figure 1:
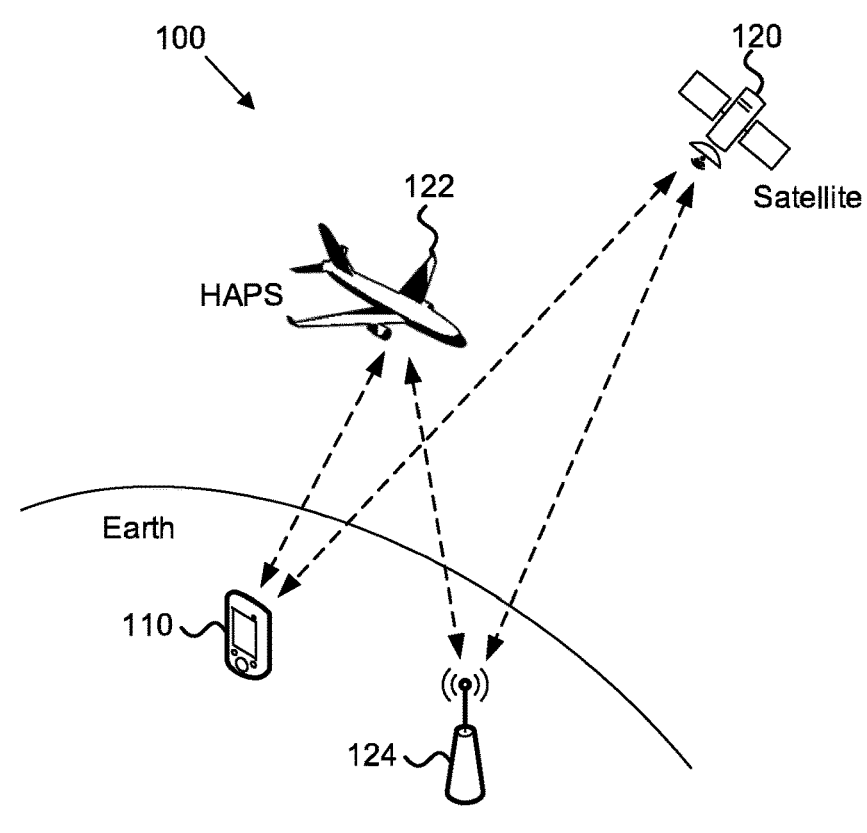
FIG. 1 illustrates an example of a non-terrestrial communication network, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Devices, such as for example user equipment (UE), may be enabled to access services through a terrestrial network (TN). Alternatively, or additionally, devices may be enabled to access services over a non-terrestrial network (NTN) provided by satellites or other non-terrestrial platforms such as for example high altitude platform systems (HAPS). Terrestrial cellular networks, such as for example networks based on 5G NR standards of the $3^{rd}$ generation parentship project (3GPP), may be configured to support non-terrestrial networks. UEs supporting NTN may have positioning capability, for example by means of an integrated global navigation satellite system (GNSS) device. In one example of an NTN system, 5G base stations (gNB) may be deployed onboard satellites, or signals may be relayed via the satellite(s) to terrestrial gNBs, for example to provide communication coverage over a very large area that may be otherwise unreachable by cellular networks. Non-terrestrial networks may be used for example to connect internet-of-things (IoT) devices globally as well as to provide personal communication in remote areas.

In order to access a non-terrestrial network, a device may perform pre-compensation of the propagation delay between the device and the base station. For this, the device may use GNSS assistance information, for example location and/or timing information, provided by the GNSS. However, the information provided by the GNSS may not be always accurate. Therefore, example embodiments of the present disclosure improve access to a non-terrestrial network, considering the trustworthiness of the GNSS information.

According to an example embodiment, an apparatus may determine satellite positioning information comprising a location of the apparatus and/or time information. The apparatus may determine an estimate of the accuracy of the satellite positioning information and select a type of random access procedure accordingly. The quality of the satellite positioning information affects the capability of the apparatus to pre-compensate for propagation delay and frequency offset in the random access procedure. Therefore, when the accuracy of the satellite positioning information is good, the UE may perform random access using an efficient 2-step procedure that may require relatively accurate pre-compensation of the propagation delay. However, when the accuracy of the satellite positioning information is poor, the UE may use more reliable 4-step procedure, which is less efficient but more resilient to errors in the pre-compensation of the propagation delay. This improves overall efficiency and reliability of random access to the non-terrestrial network.

FIG. 1 illustrates an example of a non-terrestrial communication network, according to an example embodiment. The non-terrestrial network (NTN) 100 may comprise at least one UE 110. A communication link may be provided between the UE 110 and a satellite 120, which may comprise a base station, for example a gNB. Alternatively, or additionally, the satellite 120 may be configured to relay signals between the UE 110 and a terrestrial base station 124, for example a gNB. The NTN 100 may therefore comprise a satellite network or a satellite-assisted terrestrial network. Non-terrestrial access may be however also provided by other type of non-terrestrial devices, such as for example an aeroplane 122 comprising a HAPS. Similarly, the HAPS itself may comprise a base station or be configured to relay signals between UE 110 and the terrestrial base station 124.

Satellite 120 may be located on a satellite orbit such as for example a low earth orbit (LEO), which may be located for example approximately 600 km or 1500 km above the earth. LEO satellites may support both earth fixed beams, where beams from the satellites may be oriented towards a fixed area on the surface of the earth, and earth moving beams, where the satellite beams may have a constant orientation and hence the beams may sweep the surface of the earth along with the orbit of the satellite. LEO satellites on the 600 km orbit may be associated with a maximum distance of 1932 km, one-way delay of 6.4 ms, and relative speed of approximately 7.5 km/s. LEO satellites on the 1500 km orbit may be associated with a maximum distance of 3647 km and one-way delay of 12.1 ms.

Satellite 120 may alternatively comprise a geo-stationary satellite (GEO). A GEO orbit may be located for example 35786 km above the earth. A GEO satellite may be associated with a maximum distance of 40586 km, one-way delay of 135.3 ms, and relative speed of approximately 0 m/s. The satellite 120 may also comprise a medium earth orbit (MEO) satellite, which may be located for example 8000-20000 km above the earth. A MEO satellite may be associated with a maximum distance of 14018 km and one-way delay of 46.7 ms. The non-GEO satellites may move relative to the earth while the GEO satellites may be stationary with respect to the earth. Even though some example embodiments have been described using satellites as an example, it is appreciated that example embodiments may be also applied to other non-terrestrial access systems, such as for example HAPS, which may be located for example 20-50 km above the earth.

In NTN, the round-trip time (RTT) may be very long due to the large distance between the satellite 120 and the UE 110. An example RTT for geo-stationary deployment using bent-pipe or regenerative satellite is shown in Table 1.

| GEO at 35786 km | | | |
| --- | --- | --- | --- |
| Elevation angle | Path | D (km) | Time (ms) |
| UE: 10° | Satellite - UE | 40586 | 135.286 |
| GW: 5° | Satellite - Gateway | 41126.6 | 137.088 |
| 90° | Satellite - UE | 35786 | 119.286 |
| | Bent Pipe satellite | | |
| One-way delay | Gateway - Satellite - UE | 81712.6 | 272.375 |
| Round-trip time | Twice | 163425.3 | 544.751 |
| | Regenerative Satellite | | |
| One-way delay | Satellite - UE | 40586 | 135.286 |
| Round-trip time | Satellite - UE - Satellite | 81172 | 270.572 |

The UE 110 may have GNSS support. For example, the UE 110 may have access the global positioning system (GPS) location and/or time. The GNSS support enables the UE 110 obtain an understanding of the time and/or frequency relations between the UE 110 and the satellite 120.

The satellite 120 may operate according to a transparent architecture, where the satellite 120 comprises an amplify-and-forward node, thereby allowing the targeted gNB to be located on the earth. However, as discussed above, the satellite 120 may alternatively operate according to a regenerative architecture, where the satellite 120 may comprise the gNB functionality, thereby reducing the round-trip time, for example for layer 1 (L1) operations.

To communicate over the NTN 100, the UE 110 may synchronize to the base station, for example gNB. The base station may be a central element of the system, for example responsible of making scheduling decisions for multiple UEs. Since there is a propagation delay between the UE 110 and the base station, the base station being located at the satellite 120 or accessed via satellite 120, the UE 110 may not be initially aware of the absolute timing at the base station.

For example, in the context of 5G NR, when observing the synchronization signals from a gNB, the synchronization signals may be transmitted in synchronization signal blocks (SSB), which may be further transmitted in bursts (SSB burst), thereby supporting 5G NR beams within a satellite cell. A satellite cell may comprise multiple transmit beams. After obtaining synchronization to the gNB, the UE 110 may attempt to access the satellite cell, and for this, it may use the random access (RA) procedure. The random access procedure may comprise the UE 110 transmitting a preamble, which allows a difference in time of arrival of different signals at the gNB. For example, the preamble may comprise a cyclic prefix as part of the signal. The cyclic prefix enables to receive and distinguish signals from different UEs experiencing different propagation delays.

A preamble design for 5G NR may be designed to allow a propagation delay that corresponds to more than 100 km of distance between the gNB and the UE 110. However, the allowed propagation delay may not be sufficient for NTN and therefore other solutions may be considered to address the problem of long time difference between preamble signals received from different UEs.

The UE 110 may be configured to operate according to at least one of the following embodiments to obtain knowledge of the correct time to transmit its random access preamble, while ensuring that it is within the configured cyclic prefix.

1) GNSS location based embodiment. Under this approach, the UE 110 may obtain its geographical location from the GNSS system. This enables the UE 110 to be aware of its location, for example in coordinates xyz, at any given time. Furthermore, the satellite 120 may broadcast its corresponding location in the space, which may be also expressed in the xyz-coordinates. The satellite 120 may also broadcast its velocity vector, for example its velocity in all the three directions (xyz). Based on the location of the satellite 120, the UE 110 may calculate the line-of-sight distance between the UE 110 and the satellite 120. Based on the velocity of the satellite, the UE 110 may also determine predicted location(s), and thereby also predicted line-of-sight distance(s), of the satellite 120, for example for a period of time in the future. Based on the line-of-sight distance, the UE 110 may pre-compensate the transmit timing of its random access preamble to ensure that it is received within the cyclic prefix, which the gNB has configured. For example, the UE 110 may determine a timing advance comprising the time that the signal takes to propagate the determined line-of-sight distance between the UE 110 and the satellite 120. Pre-compensation may comprise the UE 110 transmitting the random access preamble a determined period (the timing advance) before an otherwise applicable transmission time of the preamble. The timing advance used for pre-compensation when transmitting the RA preamble may be called an initial timing advance. In case of the transparent architecture, also the delay due to the feeder link from the satellite to a terrestrial gNB may be pre-compensated. This may be implemented for example by the terrestrial gNB providing information of the feeder link delay to the UE 110, for example through broadcast.

2) GNSS time based embodiment. Under this approach, the UE 110 may receive reference time information from the gNB, which may be for example broadcasted in system information block 9 (SIBS). The reference time may be indicated for example by parameter referenceTimeInfo-r16, which may indicate a reference time (e.g. in universal time clock (UTC)) and a reference point in the gNB transmission which the indicated reference time is associated to. When UE 110 decodes the GNSS signal(s), it gets corresponding understanding of time (e.g. in UTC) from the GNSS system. The UE 110 may therefore derive the difference in the indicated reference time of the indicated reference point in the gNB signal and the time base of the UE 110. Based on this, the UE 110 may pre-compensate the transmit timing to meet the requirement of random access preambles being received at the gNB within the cyclic prefix, similar to the GNSS location based embodiment.

Figure 2:
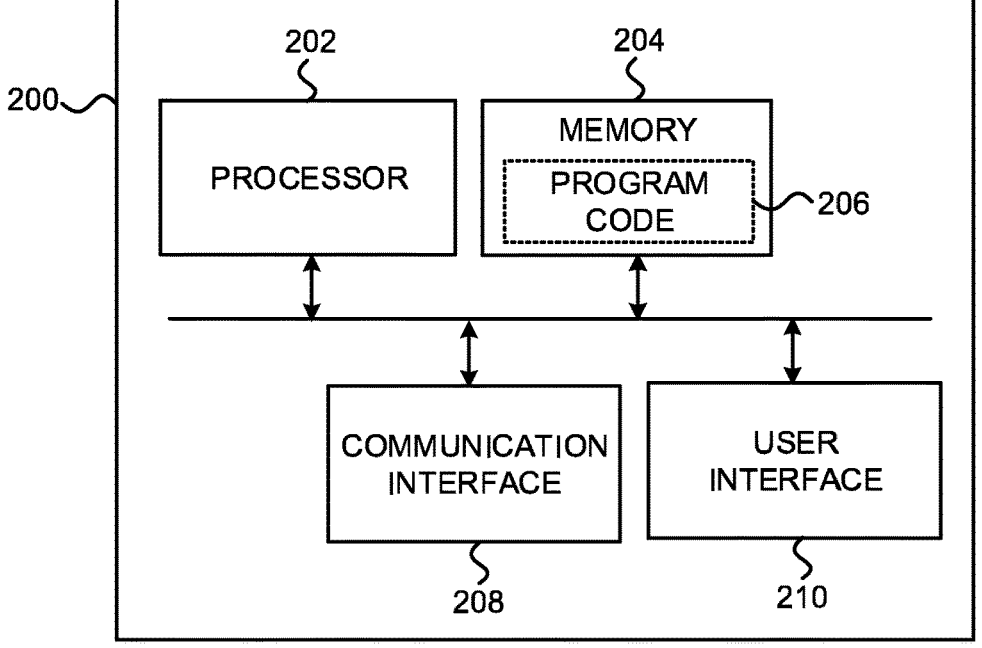
FIG. 2 illustrates an example of an apparatus configured to practice one or more example embodiments.

FIG. 2 illustrates an example embodiment of an apparatus 200, for example UE 110, satellite 120, a base station, or a component or a chipset of the UE 110, the satellite 120, or the base station. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and/or data in accordance with at least one cellular communication protocol and/or one or more GNSS protocols. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, an antenna or a plurality of antennas to transmit and/or receive radio frequency signals. One or more of the various types of connections may be also implemented as separate communication interfaces, which may be coupled or configured to be coupled to an antenna or a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-ona-chip systems (SOCs), Complex Programmable Logic Devices (CPLDs), Graphics Processing Units (GPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
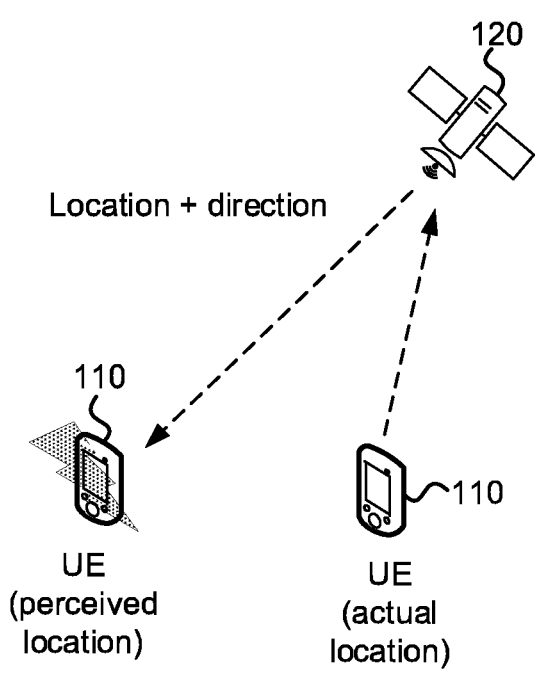
FIG. 3 illustrates an example of perceived and actual locations of a UE, according to an example embodiment.

FIG. 3 illustrates an example of perceived and actual locations of a UE, according to an example embodiment. As discussed above, the location provided by the GNSS system may not be always accurate. Potential sources for inaccurate GNSS information include dense urban environments, locations with limited GNSS coverage (e.g. semi-indoor), locations in deep forests or otherwise limited vision to the sky, or the GNSS system being subject to disturbances such as for example outage, spoofing, interference, or the like.

If the perceived location of the UE 110 is not aligned with the actual position, or the UE 110 is not able to derive GNSS-provided timing with sufficient accuracy, the UE 110 may not be able to perform pre-compensation for random access with sufficient accuracy. For example, the internal algorithm of the UE 110, using its understanding of the propagation delay to the gNB for compensating the transmit timing for random access preamble and optionally later signals, may provide a wrong time offset (timing advance) and/or frequency offset and therefore the signals received at the gNB may be offset to a level that may not be acceptable for maintaining network performance.

The example embodiments of the present disclosure relate for example to the problem of the UE 110 not getting any response to the RA preamble from the gNB within an expected time window of response. This may be related to the operation of the UE 110 prior to reception of Msg2 of the random access procedure, as will be further described below.

Figure 4:
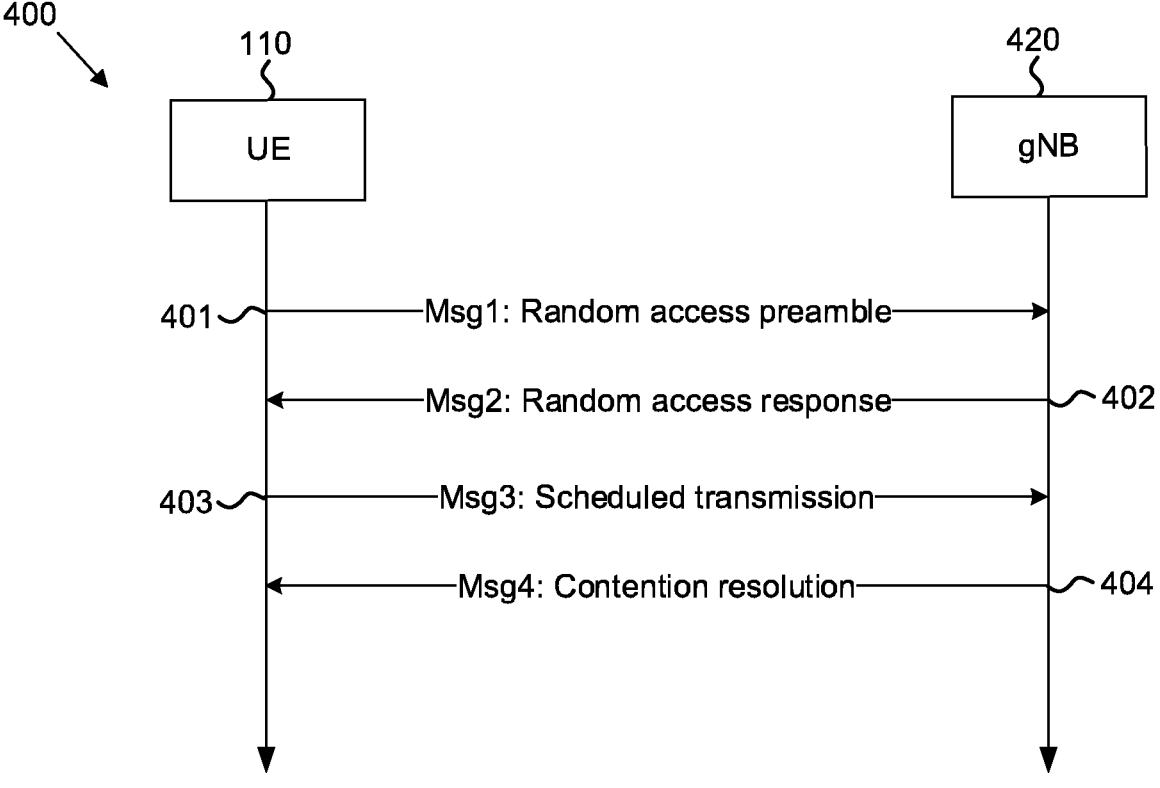
FIG. 4 illustrates an example of a four-step random access procedure, according to an example embodiment.

FIG. 4 illustrates an example of a 4-step random access procedure 400, according to an example embodiment. The gNB 420 may be included in satellite 120 or a HAPS included the aeroplane 122, or be the terrestrial base station 124. The random access procedure 400 is provided as an example of one type of random access process.

At operation 401, the UE 110 may transmit a random access (RA) preamble. The RA preamble may comprise a first message (Msg1). Msg1 may be also called a random access request. The RA preamble may be transmitted on a physical random access channel (PRACH). The random access preamble may comprise at least one preamble sequence and a cyclic prefix. The cyclic prefix may be located before the preamble sequence(s) in transmission order. The gNB 420 may receive the RA preamble. After transmission of the RA preamble the UE 110 may initiate monitoring for an RA response, for example on a physical downlink control channel (PDCCH).

At operation 402, the gNB 420 may transmit a random access (RA) response. The RA response may comprise a second message (Msg2). The RA response may comprise an identifier of the RA preamble received by the gNB 420 at operation 401. In response to receiving an RA response comprising the identifier of the RA preamble transmitted at operation 401, the UE 110 may determine the RA response to be successful and proceed to transmitting a scheduled uplink transmission. In response to not receiving an RA response, for example within a configured RA response window, or failing to verify the RA response, the UE 110 may determine that the RA response has failed. In this case, the UE 110 may determine to try random access again or determine the RA procedure to have failed.

The RA response may indicate to the UE 110, which uplink resources it can use to perform its uplink transmission of following message(s) to the gNB 420. The RA response may further comprise an indication of a network configured timing advance to be applied for adjusting the transmit timing of the UE 110, for example as a timing advance command (TAC). The network configured timing advance may be different from the (initial) timing advance used pre-compensation for transmitting the RA preamble. The UE 110 may apply the network configured timing advance on top of the initial timing advance. For example, a timing advance applied for subsequent messages may comprise a sum of the initial timing advance and the network configured timing advance. This enables the UE 110 to further adjust the timing for transmission of subsequent messages.

At operation 403, the UE 110 may transmit a scheduled transmission. The scheduled (uplink) transmission may comprise a third message (Msg3). The UE 110 may adjust the transmission time of the scheduled transmission based on the indication of the network configured timing advance received at operation 402. This enables to ensure that the scheduled transmission is aligned with other uplink signals from other UEs and thereby to maintain orthogonality between the signals received at the gNB 420, even with a relatively short cyclic prefix of the scheduled transmission. The scheduled transmission (Msg3) may comprise control information, for example a medium access control (MAC) control element (CE)) such as a C-RNTI (cell radio network temporary identifier) MAC CE. Alternatively, or additionally, the scheduled transmission may comprise common control channel (CCCH) information, for example one or more CCCH service data units (SDU). The data carried by the scheduled transmission may hence comprise data submitted from an upper protocol layer. The data may be associated with the UE contention resolution identity, as part of the random access procedure. The scheduled transmission may in general comprise any information scheduled for transmission in the random access procedure after the RA preamble. The UE 110 may initiate a contention resolution timer in response to transmission of the scheduled transmission. The scheduled transmission (Msg3) may be transmitted in response to receiving the RA response (Msg2).

At operation 404, the gNB 420 may transmit a contention resolution message. The contention resolution may comprise a fourth message (Msg4). The contention resolution massage may be transmitted on the PDCCH or the physical downlink shared channel (PDSCH). The UE 110 may determine the contention resolution to be successful, in response to receiving a contention resolution message addressed to the UE 110, for example by a particular value of the (C-RNTI.

Figure 5:
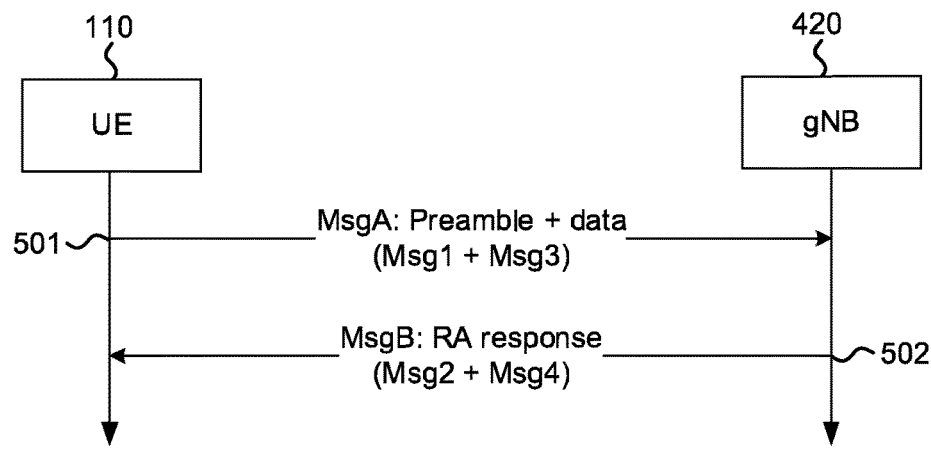
FIG. 5 illustrates an example of a two-step random access procedure, according to an example embodiment.

FIG. 5 illustrates an example of a 2-step random access procedure, according to an example embodiment. The random access procedure 500 is provided as an example of a second type of random access process.

At operation 501, the UE 110 may transmit a random access preamble and data (PUSCH). These messages may be transmitted together (e.g. one after another) and the combination of these messages may be referred to as MsgA. Therefore, MsgA may comprise a first element, Msg1 (=MsgA preamble), and a second element, Msg3 (=MsgA PUSCH). The MsgA preamble may comprise an RA preamble similar to operation 401. The MsgA PUSCH may comprise information content similar to the scheduled transmission of operation 403. The gNB 420 may receive the RA preamble and the data (PUSCH). Operation 501 may therefore comprise consecutive transmission of the RA preamble and the scheduled transmission. For example, the scheduled transmission may be transmitted before reception of the RA response (response to the RA preamble) from the gNB 420. Accordingly, the UE 110 may transmit the scheduled transmission without receiving a response to the RA preamble before the scheduled transmission. It is however noted that there may be a time gap between transmission of the RA preamble and the scheduled transmission. The RA preamble and the scheduled transmission may be also transmitted on different channels (e.g. PRACH and PUSCH).

At operation 502, the gNB 420 may transmit an RA response and a contention resolution message. These messages may be transmitted together (e.g. one after another) and the combination of these messages may be referred to as MsgB. Therefore, MsgB may comprise a first element, Msg3 similar to the RA response of operation 402, and a second element, Msg4 similar to the (contention resolution of operation 404. Operation 502 may therefore comprise consecutive transmission of the RA response and the contention resolution messages. The UE 110 may receive the RA response and the contention resolution message.

It is noted that, contrary to the 4-step RA procedure 400, in the 2-step RA procedure 500 the PUSCH (Msg3) may be transmitted without the network configured timing advance information provided by the gNB, for example as the timing advance command (TAC). Therefore, the 2-step RA procedure may not provide time alignment of the signals transmitted by different UEs prior to transmission of the MsgA PUSCH, and hence this part of the transmission may be more susceptible to timing errors. In this case, the only timing protection mechanism for the PUSCH may be provided by the cyclic prefix (CP), which may be shorter than the cyclic prefix of the RA preamble. Some RA preamble formats allow for a quite extensive duration of the cyclic prefix and therefore, in general, the 4-step RA procedure 400 may be less sensitive to timing errors compared to the 2-step RA procedure 500, where the performance may be limited by the shorter cyclic prefix of the MsgA PUSCH.

In NTN systems, the UE 110 may use a non-zero timing advance value, which may be defined or configured by the gNB 420. Alternatively, the UE 110 may autonomously determine the time offset (timing advance) value to be applied for random access. As mentioned above, this initial timing advance value may be different from the timing adjustment instructed through the TAC by the gNB 420 in Msg2. With uncertainty of the location of the UE 110 and/or the location of the satellite 120, as well as the UE's 110 understanding of time as obtained based on GNSS and gNB time information, there is a risk that the UE 110 selects a wrong timing advance value for the random access procedure. To reduce the risk of random access failure due to inaccurate GNSS information, potential time inaccuracies may taken into account when selecting which type of random access procedure to initiate.

Example embodiments of the present disclosure therefore provide an extended random access type selection procedure that takes into account an estimate of the quality of the timing advance autonomously determined by the UE 110. For example, the UE 110 may be allowed to initiate a 2-step RA procedure only if the quality of the timing advance value determined by the UE 110 is considered sufficient to schedule the transmissions of the UE 110, for example MsgA PUSCH, such that it is received at the gNB 420 within the cyclic prefix of the transmissions of the other UEs.

Figure 6:
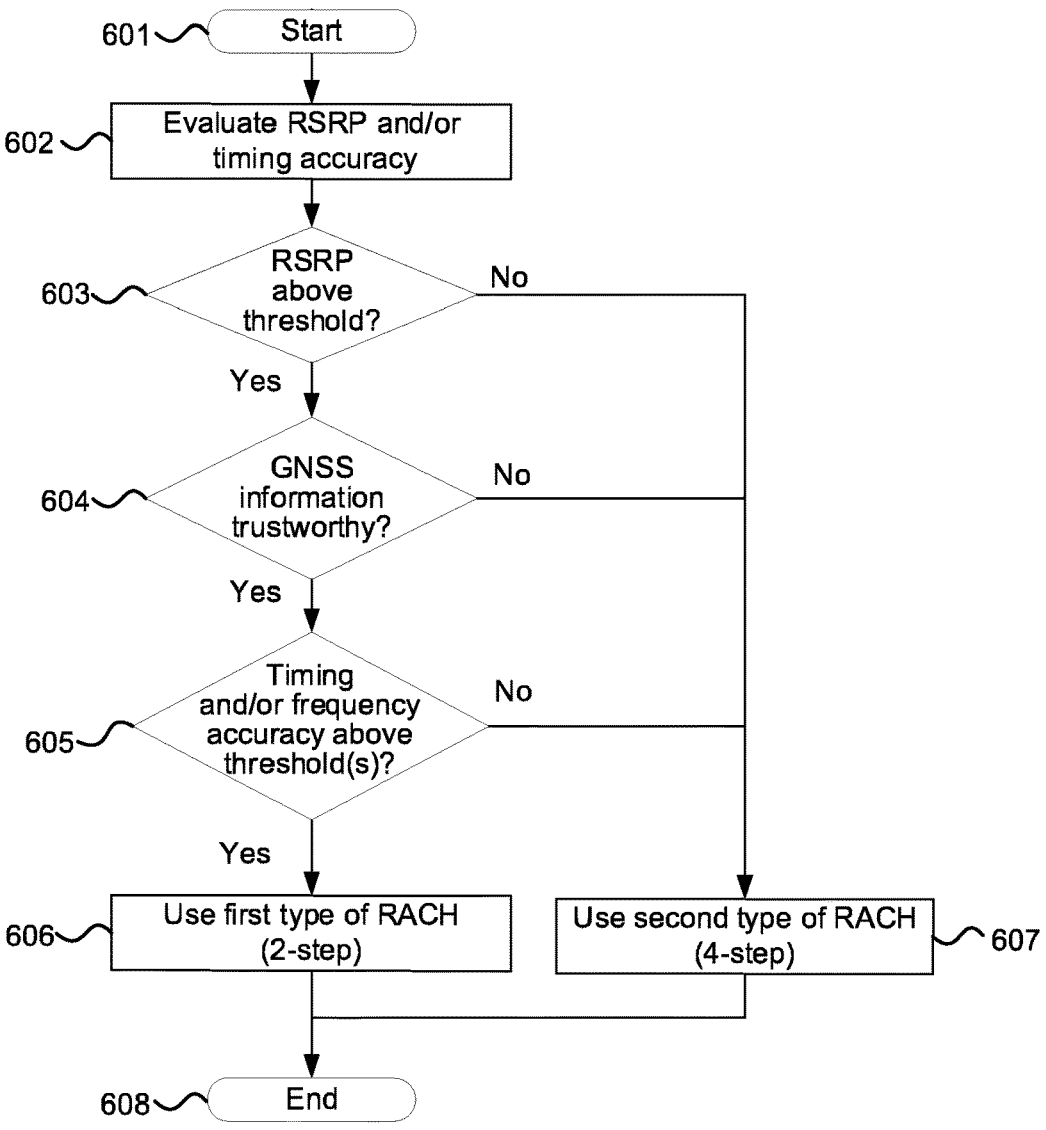
FIG. 6 illustrates example of a procedure for determining a type of random access procedure, according to an example embodiment.

FIG. 6 illustrates example of a procedure for determining a type of random access procedure, according to an example embodiment. The procedure may be performed by an apparatus, such as for example UE 110. The procedure may be started at operation 601.

At operation 602, the UE 110 may evaluate reference signal received power (RSRP) and/or timing accuracy. RSRP is provided as an example of a measure for received signal strength. It is however noted that received signal strength may be assessed based on any suitable signal received from the communication network to be accessed, for example from gNB 420. The UE 110 may further evaluate quality of the timing estimate (timing accuracy of the GNSS time) determined based on the GNSS signals, which may be associated with the location estimation. Alternatively, or additionally, the UE 110 may therefore evaluate the location accuracy, which may be also used to assess quality of the timing advance (time offset) value determined by the UE 110 based on the GNSS information. In general, the UE 110 may determine an estimate of the accuracy of the GNSS information (satellite positioning information), which may include a location of the apparatus and/or time information. The GNSS information may be derived by UE 110 based on received GNSS signal(s). The time information may comprise a current time at the time of reception of the GNSS signal(s), which may be determined based on information about transmission time at the corresponding satellite(s). The UE 110 may use the time information to synchronize its clock with the GNSS time and thereafter operate under a time base synchronized with the GNSS time, optionally with an offset, for example to map the GNSS time to the UTC.

The timing or location accuracy of the GNSS, or in general the reliability of the GNSS information, may be determined based on various parameters. For example, at least one the following parameters may be considered when evaluating reliability of the GNSS information:

Number of GNSS supported GNSS systems. UE 110 may be equipped with one or more GNSS systems such as for example the global positioning system (GPS), Galileo, or the BeiDou navigation satellite system (BDS). As the number of supported GNSS systems increases, the UE 110 is capable of acquiring more reliable and accurate GNSS information. Therefore, higher reliability value may be given to the UE 110, if it supports more GNSS systems.

Number of supported GNSS frequency bands. UE 110 may support GNSS reception over one or more frequency bands such as for example the upper L-Band and/or the lower L-band. The accuracy of the GNSS information may increase along with the number of supported frequency bands. A higher reliability value may be given to the UE 110 if it supports more frequency bands. For example a dual-band GNSS device supporting two frequency bands may be given a higher reliability value compared to a single-band GNSS device supporting one frequency band.

Antenna type or characteristics. The performance of the GNSS antenna of the UE 110 also affects the reliability of GNSS information. The given reliability value of the GNSS information may be therefore dependent on an antenna type or characteristics of the UE 110. For example, information of the GNSS antenna or its characteristics, for example in terms of antenna gain, may be preconfigured in the memory of the UE 110. The reliability of the GNSS information may be then increased or decreased based on the information about the GNSS antenna.

Number of simultaneous receive channels supported. The accuracy of acquired GNSS information depends on the number of satellites from which the signals are received. Therefore, the UE 110 may support multiple tracking channels to follow multiple satellites simultaneously, optionally across multiple GNSS systems. Capability of receiving multiple channels simultaneously may improve the accuracy, for example since errors in in the GNSS information may be corrected more effectively.

Type of positioning algorithms. The UE 110, or its GNSS device, may be configured with one or more positioning algorithms to improve the GNSS information. The UE 110 may be hardcoded with certain positioning algorithm(s) or the UE 110 may determine which positioning algorithm(s) to use, for example to optimize power consumption. The reliability of the GNSS information may be therefore determined based on the type of positioning algorithm(s) available at the UE 110, or used for determining the GNSS information.

Dilution of precision (DOP). DOP of is a measure that describes how much errors in the measurement affect the result of the estimation. DOP may be determined based on the positions of the satellites used for determining the GNSS information at the UE 110. The effect of geometry of the satellites on position error may be referred to as the geometric dilution of precision (GDOP). Time dilution of the precision (TDOP) may indicate the uncertainty of the clock. Values of the different types of DOP may be give as an integer number, where a larger value indicates weaker precision.

The reliability of the GNSS information, for example the timing accuracy and/or location accuracy, may be determined based on any of the above parameters, or a combination thereof. For example, any parameter may be given a reliability value, for example an integer value, within a certain range, which may be same of different for different parameters. The reliability values of the parameters may be determined for example based on look-up table(s) comprising mapping between the reliability values and different parameter values or characteristics of the GNSS device. For example, on a scale of 1 to 5 with respect to the number of supported GNSS systems, a dual-mode GNSS device may be given a reliability value 3 and a single-mode GNSS device may be given a value 1, or vice versa. The overall reliability of the GNSS information may be then determined based on a combination, for example sum or multiplication, of the reliability values of one or more of the parameters. A threshold may be set to the overall reliability value of the GNSS information to determine, which type of random access procedure to use, as will be further described below.

The UE 110 may also determine an estimate of frequency accuracy, for example based on a frequency reference from the GNSS system. The UE 110 may further determine a frequency offset for performing random access to the communication network. The timing advance (time offset) and the frequency offset may be calculated or estimated jointly, for example either based on location information of the UE 110 and the satellite 120 or based on time and/or reference frequency from the GNSS system. A frequency offset may occur if the GNSS time reference is inaccurate. The UE 110 may compensate the frequency offset when performing the random access, which increases probability of successful random access. The Doppler frequency may be calculated based on the relative movement between the satellite 120 and the UE 110. So, knowing the location of the satellite 120 and the UE 110 and their movement, which in the case of NTN may be dominated by the movement of the satellite, the UE 110 may determined the Doppler frequency. Furthermore, GNSS reference frequency can be used to determine the internal frequency error of the UE 110.

At operation 603, the UE 110 may determine whether the RSRP is above a threshold. The threshold may be preconfigured at the UE 110 or the UE 110 may receive an indication of the threshold form the communication network, for example from gNB 420. If the RSRP is not above the threshold, the UE 110 may move to operation 607. If the RSRP is above the threshold, the UE 110 may move to operation 604. Therefore, the UE 110 may be allowed to initiate a 2-step RA procedure (if configured in the current cell) if the RSRP is higher than the threshold. For regular cells, there may be a correlation between the received signal levels and the propagation delay between the gNB 420 and the UE 110. Hence, whenever the RSRP is higher than the threshold, the propagation delay is likely to be low enough to ensure protection by the cyclic prefix when the gNB 420 receives the MsgA PUSCH of the UE 110. However, the RSRP measurement may also depend on other factors, such as for example signal blockage. Therefore, determination of the location of the UE 110, the propagation delay to the gNB 420, and the corresponding preamble transmission time (timing advance) may not be solely based on the RSRP level. However, in combination with the GNSS based information of operations 604 and/or 605, the use of RSRP as a criterion for selecting the type of random access procedure further improves reliability.

At operation 604, the UE 110 may determine whether the GNSS information is trustworthy. For example, the UE 110 may compare the (overall) reliability value given to the GNSS information to a threshold, which may be different from the threshold for RSRP applied in operation 603. This threshold may be as well preconfigured at the UE 110 or an indication of the threshold may be received form the communication network, for example from gNB 420, for example included in one or more control messages. Operation 604 may in general comprise estimating whether the GNSS signal(s) can be trusted, for example whether they are spoofed or whether the number of available satellites is high enough to except a trustworthy service. If the GNSS information is not considered trustworthy, the UE 110 may move to operation 607. If the GNSS information is considered trustworthy, the UE 110 may move to operation 605.

At operation 605, the UE 110 may determine whether timing and/or frequency accuracy are above threshold(s). There may be separate thresholds for the timing accuracy and frequency accuracy. If both time and frequency accuracy are considered, the UE 110 may move to operation 607 if either the time or frequency accuracy is not above the respective threshold. If both time and frequency accuracies are above the respective thresholds, the UE 110 may move to operation 606. If the UE 110 considers just one of the time and frequency accuracies, the UE 110 may move to operation 606 if the considered accuracy is above the respective threshold. Otherwise, the UE 110 may move to operation 607. The timing and/or frequency accuracy may be determined for example based on the DOP, as described above.

The UE 110 may also determine whether the determined timing advance and/or the frequency offset for performing the random access comply with at least one configured value, for example threshold(s). The UE 110 may for example determine whether the timing advance and/or the frequency offset are within configured value(s). These value(s) maybe preconfigured at the UE 110 or an indication of the value(s) may be received from the communication network, for example from gNB 420. The indication may be included for example in one or more control messages. If the timing advance and/or the frequency offset comply with the configured value(s), the UE 110 may move to operation 606. If the timing advance and/or the frequency offset do not comply with the configured value(s), the UE 110 may move to operation 607.

At operation 606, the UE 110 may use a first type of RA (RACH) procedure to perform random access to the communication network. The first type of RA procedure may comprise the 2-step RA procedure 500, for example according to 3GPP specifications such as 5G NR. Because of the above determinations, this operation may be entered if the accuracy of the GNSS information estimated to be sufficient for the 2-step RA procedure, for example when the quality of the timing advance value autonomously determined by UE 110 is such that the transmission of the MsgA PUSCH by UE 110 will be within the cyclic prefix of PUSCH transmissions of the other UEs with a high probability.

At operation 607, the UE 110 may use a second type of RA (RACH) procedure to perform random access to the communication network. The second type of RA procedure may comprise the 4-step RA procedure 400, for example according to 3GPP specifications such as 5G NR. Because of the above determinations, this operation may be entered if the accuracy of the GNSS information is estimated not to be sufficient for the 2-step RA procedure. Operation 607 may be in general entered in response to not selecting the first type (2-step) of RA procedure. Not selecting the first type of RA process may be in response to any of operations 603, 604, or 605.

The procedure of FIG. 6 enables the UE 110 to select an appropriate random access type depending on dynamically varying and/or fixed GNSS capabilities of the UE 110. It is however noted that some functions of FIG. 6 may be omitted. For example, the type of RA procedure may be determined based on any of operations 603, 604, 605 alone or in combination with one or more of the other operations or embodiments described. Even though example embodiments of FIG. 6 has been described using 'above a threshold' and 'not above the threshold' as examples, it is appreciated that similar example embodiments may be construed by using 'above or equal to a threshold' and 'not above or equal to a threshold' or 'not below (or equal to) a threshold' and 'below (or equal to) the threshold, respectively, or other expressions having a similar function.

FIG. 7 illustrates an example of a method 700 for performing random access, according to an example embodiment.

At 701, the method may comprise determining satellite positioning information, wherein the satellite positioning information comprises a location of the apparatus and/or time information.

At 702, the method may comprise determining an estimate of an accuracy of the satellite positioning information.

At 703, the method may comprise selecting a type of random access procedure based on the estimate of the accuracy of the satellite positioning information.

At 704, the method may comprise performing random access to a communication network based on the selected type of random access procedure.

Further features of the methods directly result from the functionalities and parameters of the UE 110, or in general the apparatus 200, as described in the appended claims and throughout the specification, and are therefore not repeated here. Different variations of the methods may be also applied, as described in connection with the various example embodiments.

An apparatus may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. The means may comprise at least one processor and at least one memory including computer program code, the at least one memory and computer program code configured to, with the at least one processor, cause performance any aspect of the method(s) by the apparatus.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A user equipment (UE) apparatus, comprising:
one or more processors, and
memory storing instructions that, when executed by the one or more processors, cause the apparatus to:
determine satellite positioning information, wherein the satellite positioning information comprises a location of the apparatus and time information;
determine an estimate of an accuracy of the satellite positioning information;
select one of a first type or a second type of random access procedure based on the estimate of the accuracy of the satellite positioning information,
wherein the first type of random access procedure, is in response to determining that the estimate of the accuracy of the satellite positioning information is above a first threshold, wherein the first type of random access procedure comprises transmission of a random access preamble and a scheduled transmission without reception of a response to the random access preamble before the scheduled transmission, wherein the first type of random access procedure comprises a two-step random access procedure of a 3GPP system, and
wherein the second type of random access procedure, is in response to determining not to select the first type of random access procedure, wherein the second type of random access procedure comprises a four-step random access procedure of the 3GPP system, and wherein the second type of random access procedure comprises:
transmission of the random access preamble; reception of a random access response; and
transmission of the scheduled transmission, in response to the reception of the random access response;
wherein selecting the first type of random access procedure is further conditioned on:
determining a received signal strength based on at least one signal received from the communication network;
determining that the received signal strength is above a second threshold;
determining a timing advance and a frequency offset for performing the random access to the communication network;
determining that the timing advance and the frequency offset for performing the random access to the communication network comply with the at least one configured value, wherein determining the frequency offset comprises calculating a Doppler frequency based on relative movement between a satellite and the UE;
receiving, from the communication network, an indication of the first threshold, the second threshold, and at least one configured value; and
perform random access to a communication network based on the selected type of random access procedure, wherein the communication network comprises a non-terrestrial network.

* * * * *